(12) United States Patent
Yeo et al.

(10) Patent No.: US 6,345,693 B1
(45) Date of Patent: Feb. 12, 2002

(54) MOTORCYCLE LIFT

(75) Inventors: Harold Yeo, Waterloo; Michael Bruyns, Oakville; Jack Nobre, Toronto, all of (CA)

(73) Assignee: Wheeltronic Ltd., Mississauga (CA)

(*) Notice: Subject to any disclaimer, the term of this patent is extended or adjusted under 35 U.S.C. 154(b) by 0 days.

(21) Appl. No.: 09/271,923

(22) Filed: Mar. 18, 1999

(51) Int. Cl.$^7$ .............................. B00S 13/00; A47F 5/00
(52) U.S. Cl. ........................ 187/211; 187/217; 187/269; 211/20
(58) Field of Search ................... 187/211, 215, 187/217, 221, 269, 272; 414/537, 426, 428; 296/61; 211/20, 21, 24; 188/32; 410/30, 49, 50; D12/115, 217

(56) References Cited

U.S. PATENT DOCUMENTS

| | | | |
|---|---|---|---|
| 256,936 A * | 4/1882 | Wicksteed | 211/24 |
| 322,057 A * | 7/1885 | Hart | 211/21 |
| 458,974 A * | 9/1891 | Merrill | 211/20 |
| 595,891 A * | 12/1897 | Robertson | 211/20 |
| 598,547 A * | 2/1898 | White | 211/21 |
| 803,196 A * | 10/1905 | Shaerman | 211/20 |
| 1,569,737 A * | 1/1926 | Fording | 211/24 |
| 1,599,921 A * | 9/1926 | Radke et al. | 188/32 |
| 1,796,557 A | 7/1929 | Bristol | |
| 1,943,003 A * | 1/1934 | Cochin | 187/217 |
| 2,316,178 A * | 4/1943 | Morgensen, Jr. | 188/32 |
| 2,521,539 A * | 9/1950 | Richardson | 188/32 |
| 3,068,962 A * | 12/1962 | Petro | 188/32 |
| 3,378,154 A * | 4/1968 | Mousel | 414/428 |
| 3,733,894 A * | 5/1973 | Dahl | 73/117 |
| 3,804,206 A | 4/1974 | Bubik | |
| D235,756 S * | 7/1975 | Townsend | D12/115 |
| 4,447,042 A * | 5/1984 | Masui | 254/90 |
| 4,724,930 A * | 2/1988 | VanLierop | 187/211 |
| 4,852,779 A * | 8/1989 | Berg | 211/21 |
| 4,909,357 A * | 3/1990 | Kawada | 187/207 |
| 5,031,726 A | 7/1991 | Wakamiya | |
| D327,666 S | 7/1992 | Carlson | |
| 5,211,265 A | 5/1993 | Gregg | |
| 5,259,711 A * | 11/1993 | Beck | 410/104 |
| 5,322,143 A * | 6/1994 | Curran | 187/211 |
| 5,331,701 A * | 7/1994 | Chase et al. | 14/71.1 |
| 5,335,755 A | 8/1994 | Miller | |
| 5,340,082 A * | 8/1994 | Holloway | 187/211 |
| 5,449,074 A * | 9/1995 | Paulson et al. | 211/24 |
| 5,462,398 A * | 10/1995 | Hymer | 414/462 |
| 5,464,076 A | 11/1995 | Benedetto, Jr. | |
| 5,570,898 A * | 11/1996 | Albert | 280/656 |
| 5,636,711 A * | 6/1997 | Nussbaum | 187/211 |
| 5,649,803 A * | 7/1997 | Bennett | 414/537 |
| 5,667,118 A * | 9/1997 | Feaasse | 224/430 |
| 5,674,044 A * | 10/1997 | Ranes | 414/563 |
| 5,735,410 A * | 4/1998 | Kallstrom | 211/20 |
| 5,907,276 A * | 5/1999 | Lance | 340/425.5 |
| 6,042,923 A * | 3/2000 | Lewis | 428/68 |
| 6,092,787 A * | 7/2000 | Nayman | 254/10 R |

FOREIGN PATENT DOCUMENTS

| | | | | |
|---|---|---|---|---|
| DE | 0554234 | * | 1/1993 | |
| FR | 137686 | * | 9/1964 | 187/211 |
| GB | 6542 | * | 3/1896 | 211/21 |
| SE | 60086 | * | 1/1926 | 211/20 |

* cited by examiner

*Primary Examiner*—Eileen D. Lillis
*Assistant Examiner*—Paul T. Chin
(74) *Attorney, Agent, or Firm*—Eugene J. A. Gierczak

(57) ABSTRACT

A lift for a vehicle comprising a support platform for supporting a vehicle; scissor structure displaceably secured beneath the support platform for lifting the support platform and vehicle; a first and second U-shaped rod, each rod having two ends connected together at their ends for pivotal movement therabout so as to releasably secure at least one wheel of a vehicle relative the platform so as to permit a vehicle to be raised and lowered on the platform.

11 Claims, 17 Drawing Sheets

MOTORCYCLE LIFT

FIELD OF THE INVENTION

This invention relates generally to lifts and more specifically to motorcycle lifts and includes a device for locating and gripping a wheel of said motorcycle either on said motorcycle lift or on the ground.

BACKGROUND OF INVENTION

There have been a wide variety of lifts which have heretofore been manufactured and designed to raise and lower vehicles from the ground to permit working on said vehicles. Such lifts include either two post or four post or scissor lifts.

Generally speaking these and other lifts have been designed to lift and lower larger vehicles such as automobiles which have four wheels.

There have, however, been attempts to manufacture and design lifts for vehicles other than automobiles such as snowmobiles or the like.

For example U.S. Pat. No. 5,211,265 relates to a scissor-type snowmobile lift comprising a first and second cross member, rails, a pair of scissor members, two mounting brackets, a lower cross member and an hydraulic cylinder.

Moreover U.S. Pat. No. 5,335,755 relates to a structural support system for vehicle storage having two independent means to rotate a two deck inclinable structure about a pivot on a stationary structure.

Furthermore U.S. Pat. No. 5,031,726 illustrates a mechanism for automatically fixing a horizontally movable slide plate for a lifting apparatus of a lift system which includes a pair of upper and lower lift means.

Yet another device is shown in U.S. Pat. No. 3,804,206 which relates to a ramp type vehicle hoist having a pair of ramps pivotal upwardly from a ground engaging position, with rams interconnecting a ground frame with the ramps to permit raising of a vehicle upwardly.

Such prior art devices present relatively complicated structures which are not that well suited for lifting lighter vehicles such as motorcycles or the like.

Furthermore lifting mechanisms for motorcycles present a challenge to reliably secure the wheels of a motorcycle since the stability of a two wheel vehicle is less than that of a four wheel vehicle. Various arrangements have heretofore been designed to attempt to secure the wheels on a vehicle.

For example U.S. Pat. No. 5,464,076 relates to a device for securing a wheel of a wheeled vehicle to a transport vehicle. The device has a wheel receiving channel pivotally attached to a frame and a locking apparatus.

Furthermore U.S. Pat. No. 3,068,962 relates to a collapsible wheel chock comprising a base member, a wheel restraining member having a transverse portion and leg members hinged to said base member for pivotal movement to and from said base member.

Another arrangement is shown in U.S. Pat. No. 1,796,557 which illustrates a wheel stop used in connection with runways formed of inverted channel bars and having a clamp device so arranged that the stop may be moved longitudinally of the channel bars to adjust the stop to automobiles of various lengths. Finally U.S. Design Patent D327,666 relates to a bicycle stand for a single bicycle.

These and other prior art wheel locking or restraining devices also present relatively complicated structures which are not well suited in terms of providing a releasable securing device for the wheel of a motorcycle.

It is an object of this invention to provide an improved lift for vehicles and particularly for a motorcycle lift.

It is a further object of this invention to provide improved wheel locating and gripping devices for a wheel of a vehicle including that of a motorcycle.

SUMMARY OF THE INVENTION

It is an aspect of this invention to provide a lift for a vehicle comprising a support platform for supporting said vehicle; scissor means displaceably secured beneath said support platform for lifting said support platform and vehicle; means for releaseably securing at least one wheel of said vehicle relative said platform so as to permit said vehicle to be raised and lowered on said platform.

In accordance with yet another aspect of the invention a motorcycle lift is provided comprising a support platform for supporting said motorcycle; a pair of scissor assemblies beneath said support platform for lifting and lowering said support platform, each said scissor assembly comprising first and second scissor arms pivotally connected generally between their ends; first said scissor arm having a first end for supporting said lift on the ground below one end of said support platform and a glide means at said other end for supporting said support platform; one end of said second scissor arm pivotally attached to said support platform at said one end and a ground engaging roller at said other end thereof; an actuator connected between first scissor arms and said second scissor arms for raising and lowering said support platform; means for releaseably securing a wheel of said motorcycle to said support platform.

It is still another aspect of the invention to provide a device for releaseably holding a wheel comprising wheel receiving means permitting entry of a wheel therein in a first receiving position and holding said wheel when said wheel receiving means is displaced to a second holding position.

It is a further aspect of the invention to provide a wheel chock for locating and gripping a wheel of a motorcycle comprising a base; rod means pivotally connected to said base so as to locate and permit entry of a motorcycle wheel therein in a first receiving position and holding said wheel when said rod means pivots relative said base to a second holding position.

Another aspect of this invention relates to a lift for a vehicle comprising a support platform for supporting said vehicle; scissor means displaceably secured beneath said support platform for lifting said support platform and vehicle.

Figure 1:
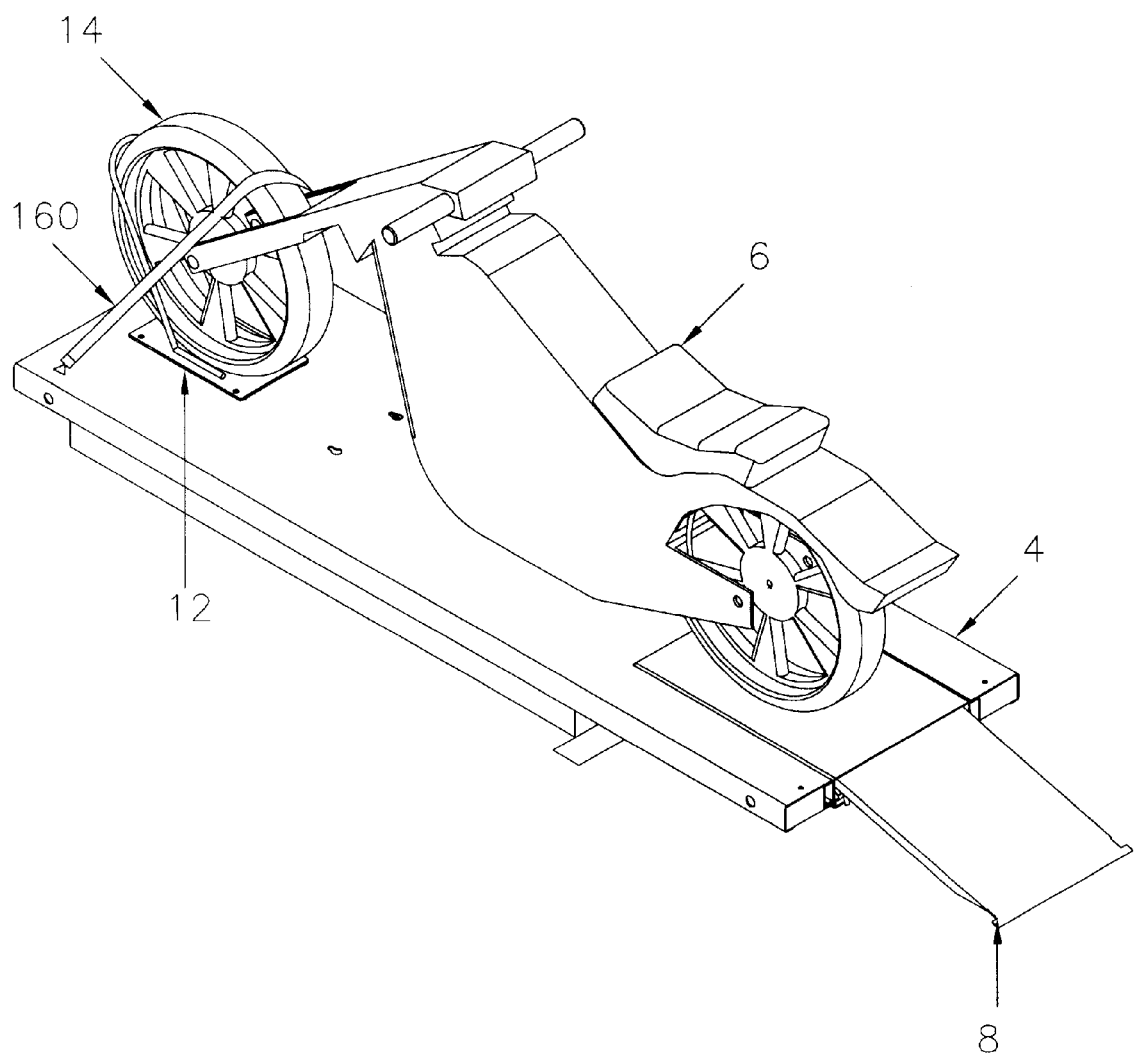
FIG. 1 is a perspective view of a motorcycle lift in a raised and lowered position.

These and other objects and features of the invention shall be described in relation to the drawings.

BEST MODE FOR CARRYING OUT THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

FIG. 1 illustrates a lift for a two wheel vehicle and in particular FIG. 1 illustrates a motorcycle lift in a lowered or collapsed position. However, the lift can be used to lift snowmobiles or other vehicles. In particular the motorcycle lift 2 comprises a support platform 4 for supporting a vehicle such as a motorcycle 6 which is adapted to be supported by the support platform 4. In particular the motorcycle 6 is driven unto the pull-out pan ramp 8.

Figure 2A:
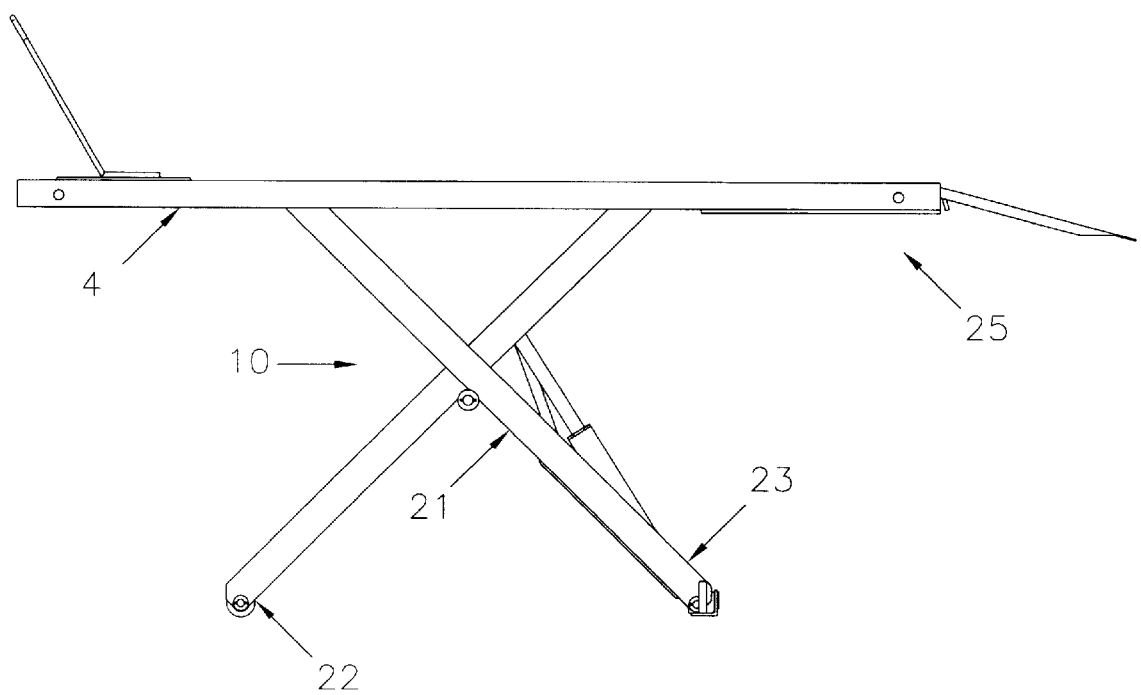
FIGS. 2a, 2b, 2c is a side elevational view of the motorcycle lift in a raised position.
Figure 2B:
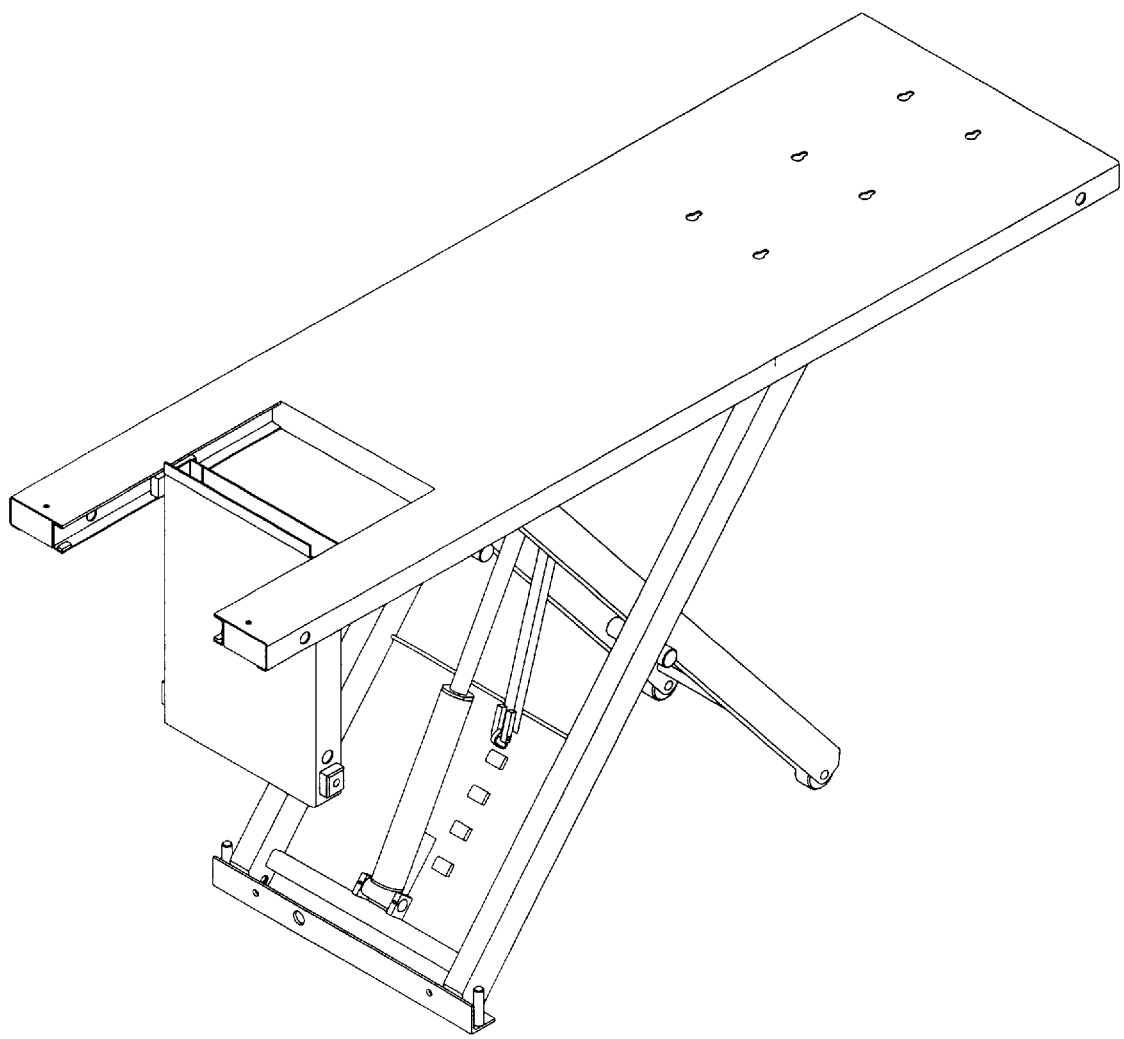

The motorcycle lift 2 is also illustrated in FIG. 2 in a raised position which comprises the support platform 4 and scissor assembly 10. FIGS. 1 and 3 also illustrate the means 12 for releaseably securing the front wheel 14 of the motorcycle 6.

FIG. 3 is an exploded view of the main components of the motorcycle lift 2. In particular the motorcycle lift comprises the support platform or ramp 4 having a cut out portion 15 adapted to receive a pull-out pan assembly which in turn is adapted to receive a pull-out ramp 18.

The lift 2 presents a pair of scissor assemblies 10 where each of the scissor assembly 10 comprises a first scissor arm 21 and a second scissor arm 22 pivotally connected to one another generally between their ends. The first scissor arm 21 has a first end 23 for supporting the lift 2 at the ground below one end 25 of the support platform 4 and includes glide means or glide blocks 27 at the other end 29 for supporting the support platform 4. The second scissor arm 22 is pivotally attached to the support platform 4 at one end 30 at said one end 25 and includes a ground engaging roller 32 at the other end 34 thereof.

Accordingly to support the motorcycle on the support platform 4 as well as providing a mechanism for raising and lowering same a pair of scissor assemblies 10 are provided which are substantially identical. Each scissor assembly 10 comprises a first and second scissor arm 21, 22.

The two first scissor arms 21 are joined by an angle iron member 40 which is adapted to bear against the ground and enhance the stability of the vehicle lift. The second arms 22 are joined by a hollow rectangular tube 42.

Figure 8:
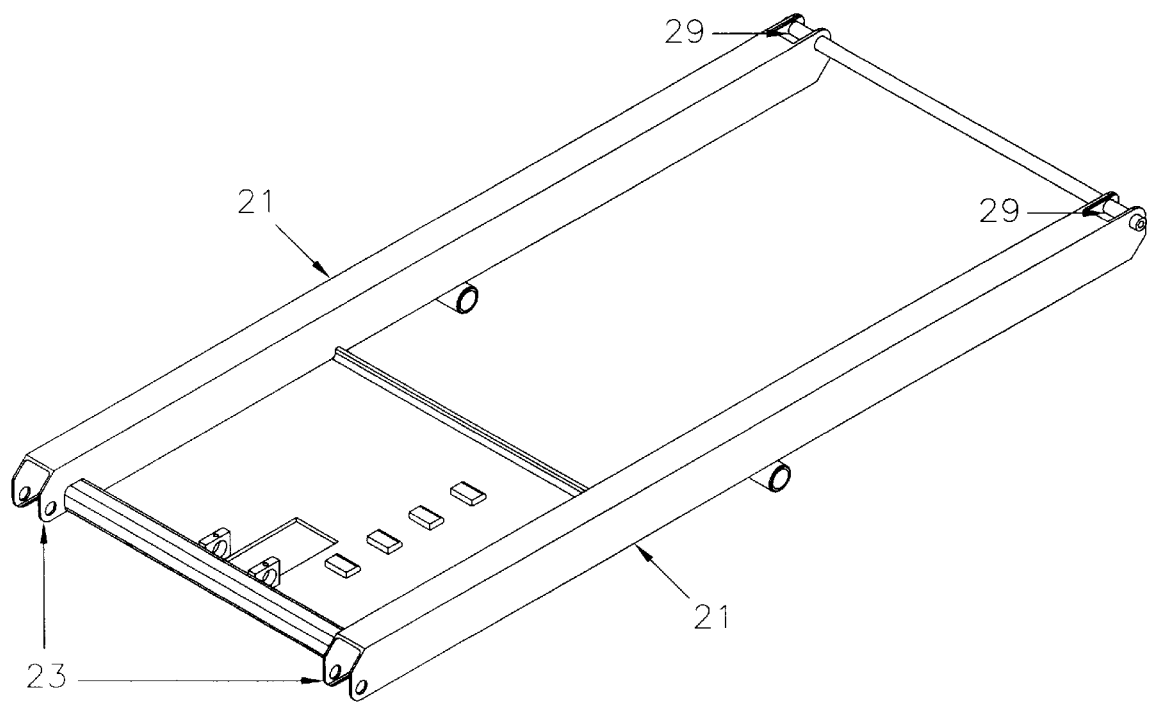
FIG. 8 is a perspective view of the first scissor arms.
Figure 9:
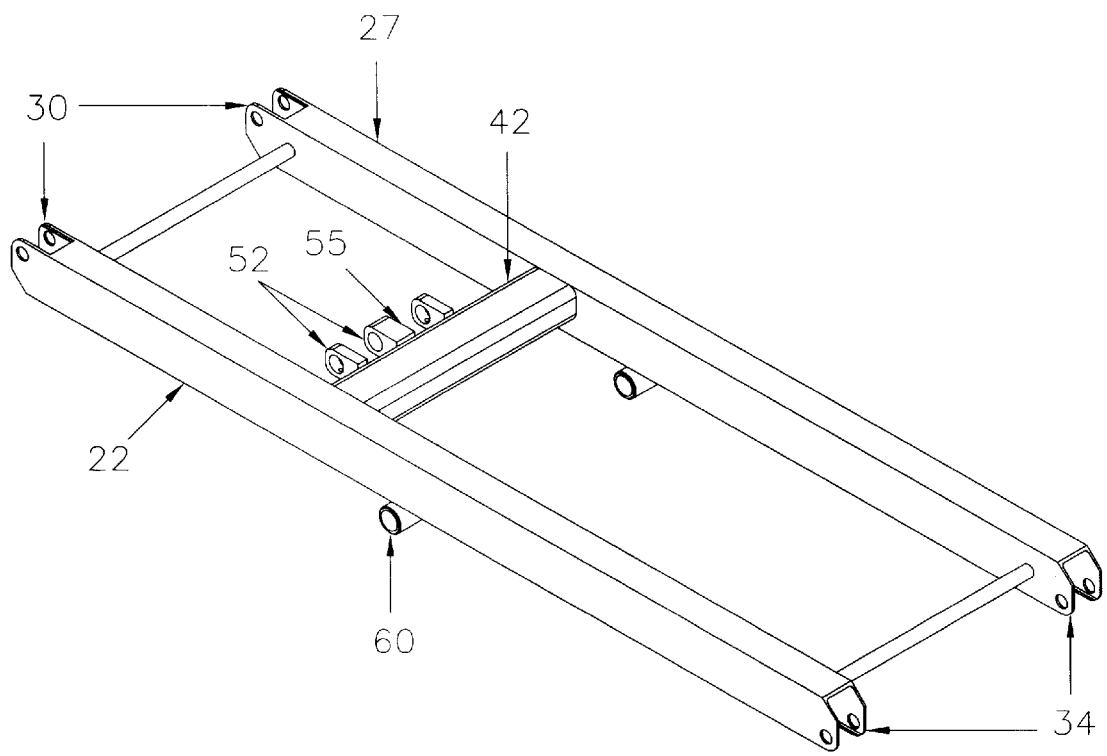
FIG. 9 is a perspective view of the second scissor arms.
Figure 10:
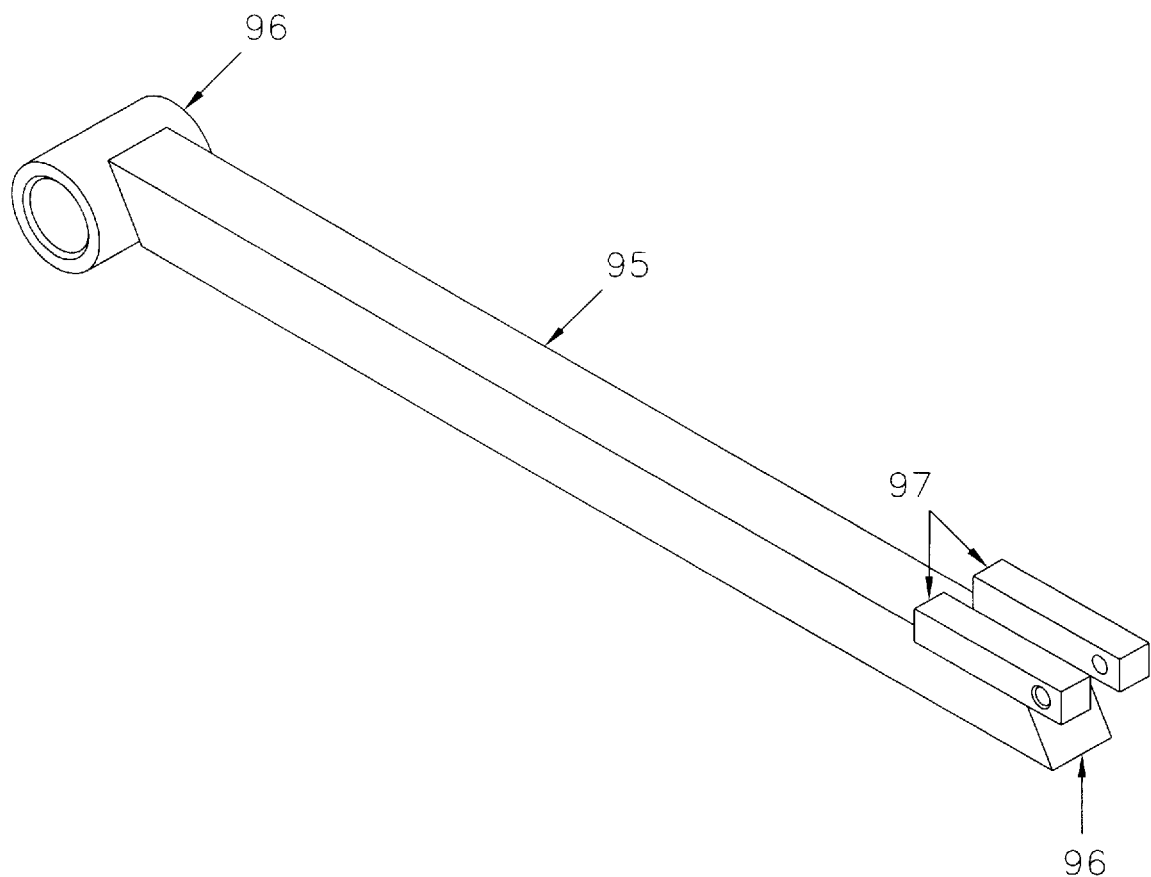
FIG. 10 is a perspective view of the locking bar.

To raise and lower the motorcycle lift a hydraulic actuation cylinder 50 is pivotally connected at one end to the first scissor arms as best illustrated in FIG. 3 and at the other end to the second scissor arms 22. More particularly the hydraulic cylinder 50 is connected at one end 51 to lugs 53 best shown in FIG. 8 for pivotal rotational motion therebetween. The other end 55 of the cylinder 50 is pivotally connected by means of a cylinder axle adapted to be received by the holes in trunnions 58. It will be apparent that the location and orientation of the hydraulic 60 can be varied between the first and second scissor arms 21 and 22 provided that fie activation of the piston 59 moves the first and second scissor arms 21 and 22 to raise and lower the support platform 4 as illustrated in the drawings.

The first and second scissor arms 21 and 22 are pivotally connected at 60 and include a thrust washer 61, bushing 62, scissor pin 63, and spring pins 64. Moreover the lower end 23 of first scissor arm 21 includes flat washers 70 and a roller pin 71 adapted to engage the angle iron 40 as shown in FIG. 3. Furthermore the angle iron 40 shows the use of hex nuts 72 and anchor bolts 73 to anchor the lift 2 to a solid foundation or ground such as concrete or the like. Washers 74 are also provided.

FIG. 3 also illustrates the second scissor arms 22 presenting a ground engaging roller 32 at the other end 34 thereof. The roller 32 is adapted to roll around roller pins 80. A flat washer 81 and bearings 82 are utilized with the roller 32. Moreover spring pins 84 are also utilized.

The hydraulic cylinder 50 includes a hydraulic hose 90 for receiving hydraulic pressure for activating the hydraulic cylinder 50. Furthermore a flow control 91 is also utilized in a manner well known to those persons skilled in the art.

The motorcycle lift described herein also includes a safety locking feature to be described herein. More particularly a lift 2 includes a locking bar or brake leg 95 included at one end 96 means for pivotal swingable movement around axle 56. At the other end of the locking bar 95 is presented a stopping edge 97 which is adapted to ride over a series of stops 97 as the hydraulic cylinder 50 raises the supporting platform upwardly. The locking bar 95 also includes two spaced projections 97 adapted to pivotally receive an over ride plate or cam member 98. The cam member includes a hole 99 which is alignable with the holes presented by members 97. As the hydraulic cylinder 50 lifts the support platform the edge 96 of locking bar 95 successively rides over the stops 97 until the hydraulic cylinder 50 reaches the upmost position whereby the edge 96 drops over the stop 97 and edge 96 buts up against stop 97 so as to prevent lowering of the hydraulic lift even in the event of a catastrophe such as sudden loss of hydraulic pressure. In order to lower the motorcycle lift the hydraulic cylinder 50 is raised slightly more upwardly such that the cam surface of cam 98 drops down between the edge 96 and stop 97 so as to permit the lowering of the locking bar 95 as the edge 96 will ride up against the cam surface of cam 98 over the stops 97.

Figure 6:
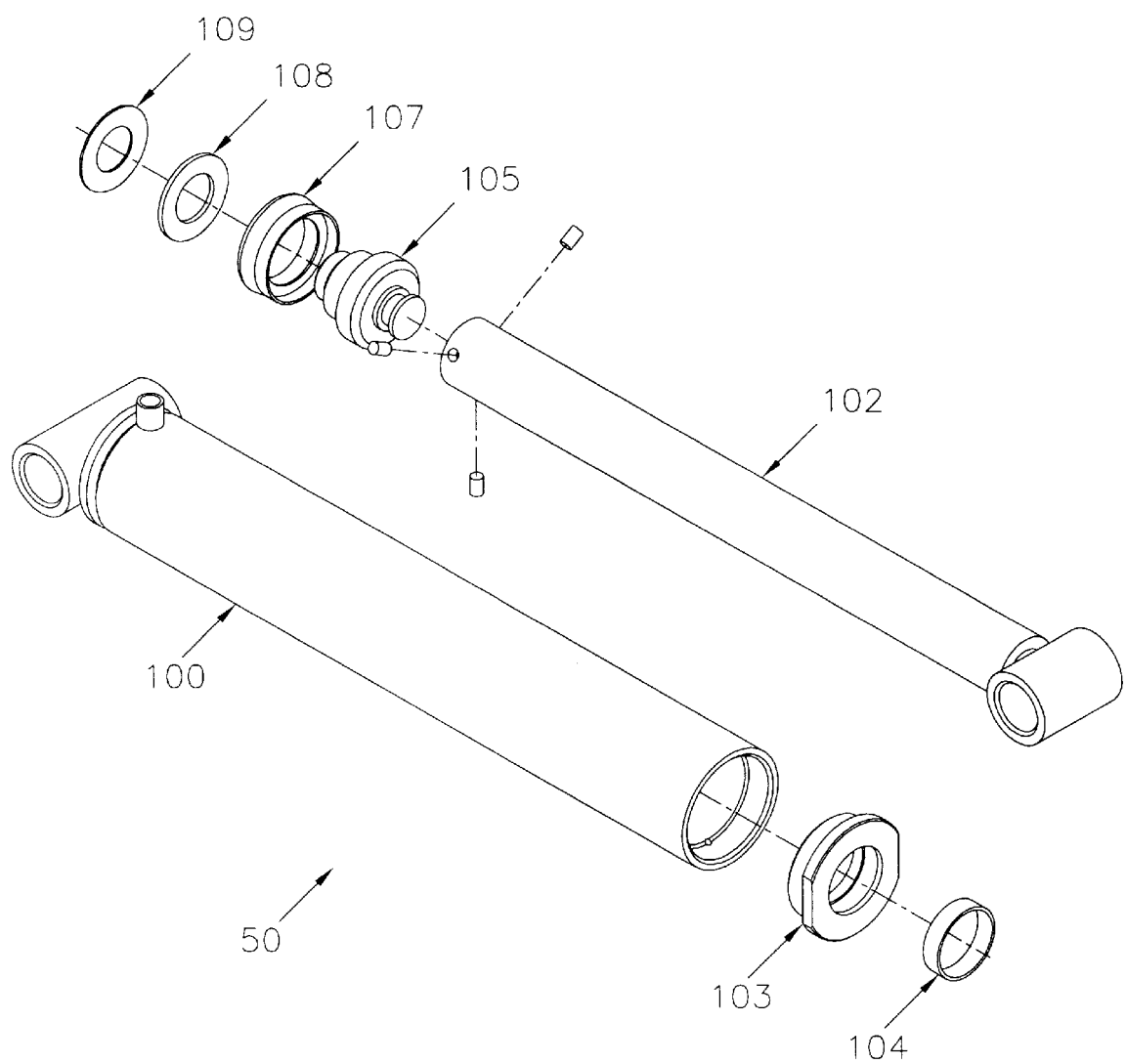
FIG. 6 is an exploded view of the hydraulic cylinder assembly.

FIG. 6 is an exploded view of the hydraulic cylinder 50 which includes a cylinder tube 100, piston rod 102, gland 103, wear ring 104 and piston 105. The hydraulic cylinder 50 also includes a seal and wear ring 107, a keeper washer 108 and an external snap ring 109.

Figure 7:
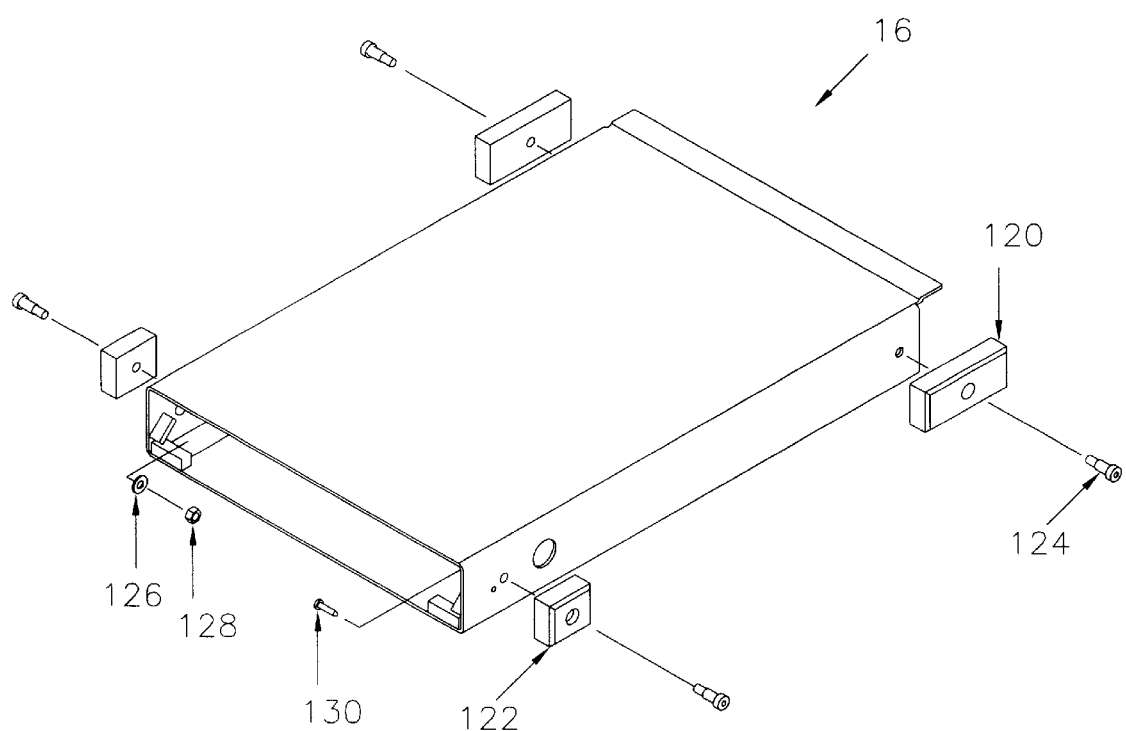
FIG. 7 is an exploded perspective view of the pull-out assembly.

The pull-out pan assembly is more fully particularized in FIG. 7 and includes from pull-out pan glide blocks 120 and rear pull-out pan glide blocks 122. Shoulder bolts 124 are provided so as to permit the pan assembly 16 to pivot about the shoulder bolts 124 as best illustrated in FIG. 2b. Hex nuts 126 and lock washers 128 are also provided along with cell tapping screws 130. The front pull-out plan glide block 120 are adapted to be received by the support platform 4 for slidable relative motion there between as best shown in FIG. 2b and 3.

Figure 11:
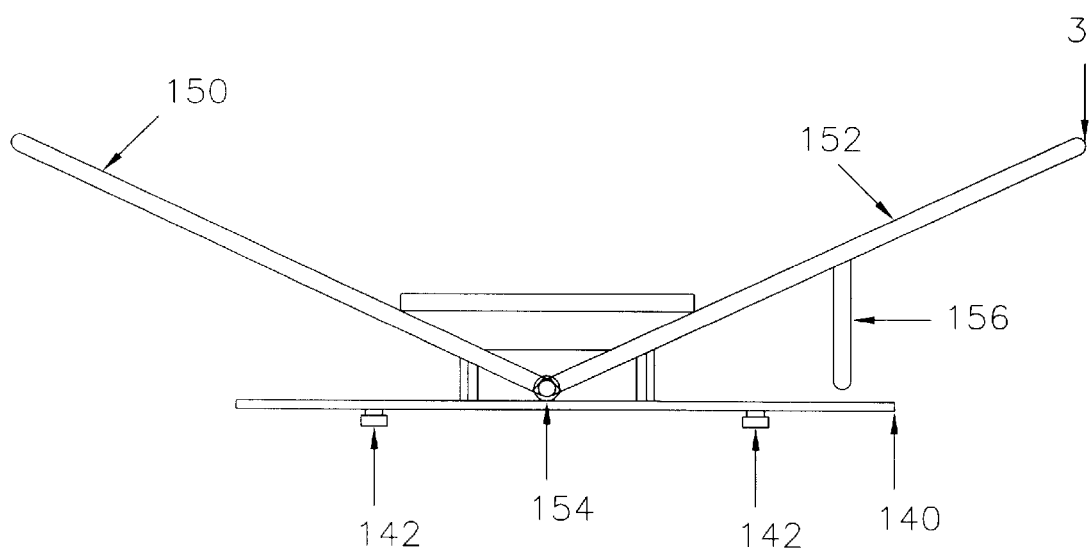
FIG. 11 is a side elevational view of a wheel chock.
Figure 12:
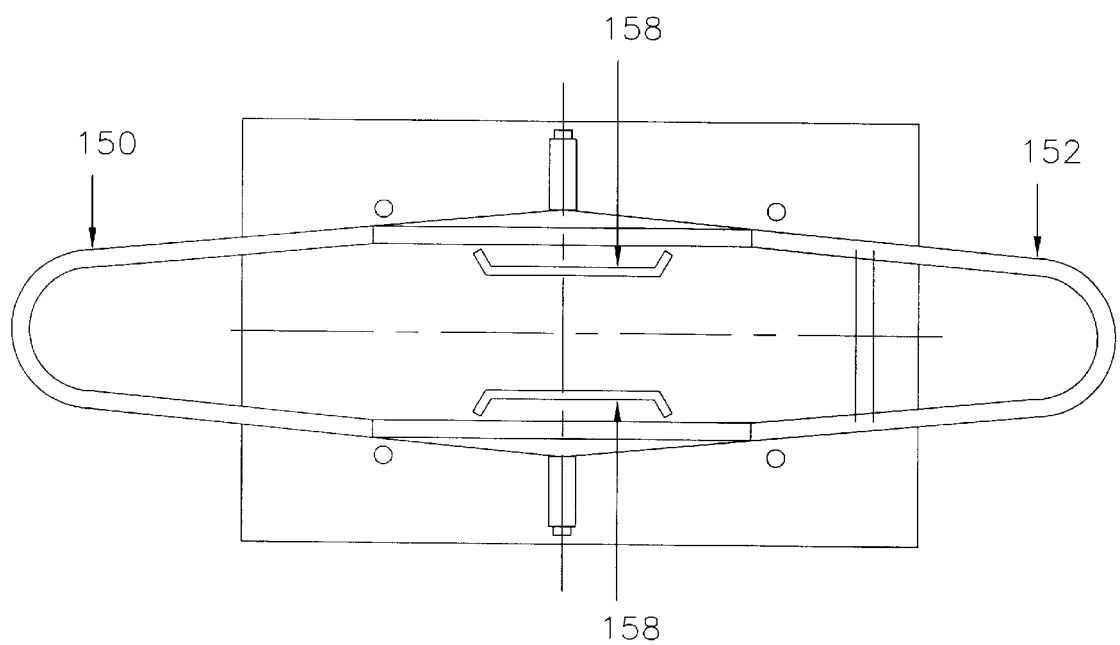
FIG. 12 is a top plan view of the wheel chock.
Figure 13:
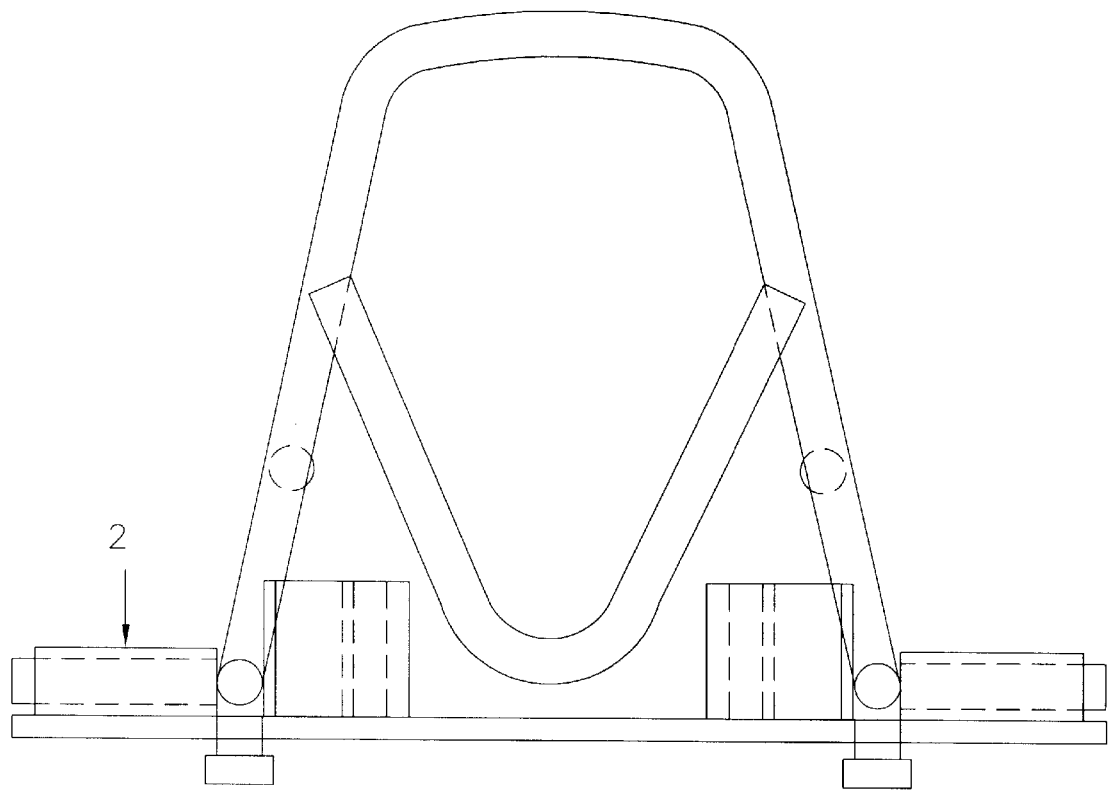
FIG. 13 is an end view of the wheel chock.
Figure 14:
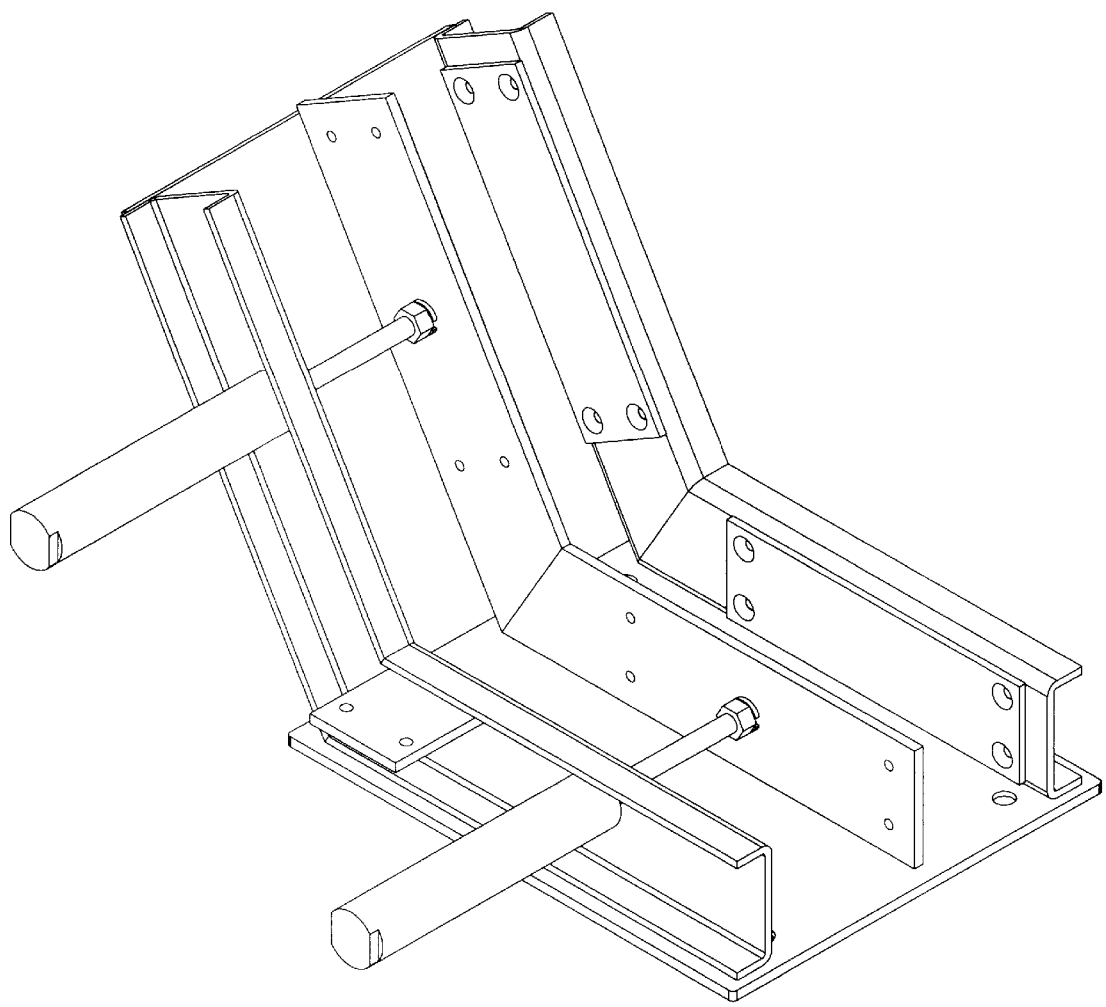
FIG. 14 is a perspective view of a wheel clamping mechanism.
Figure 15:
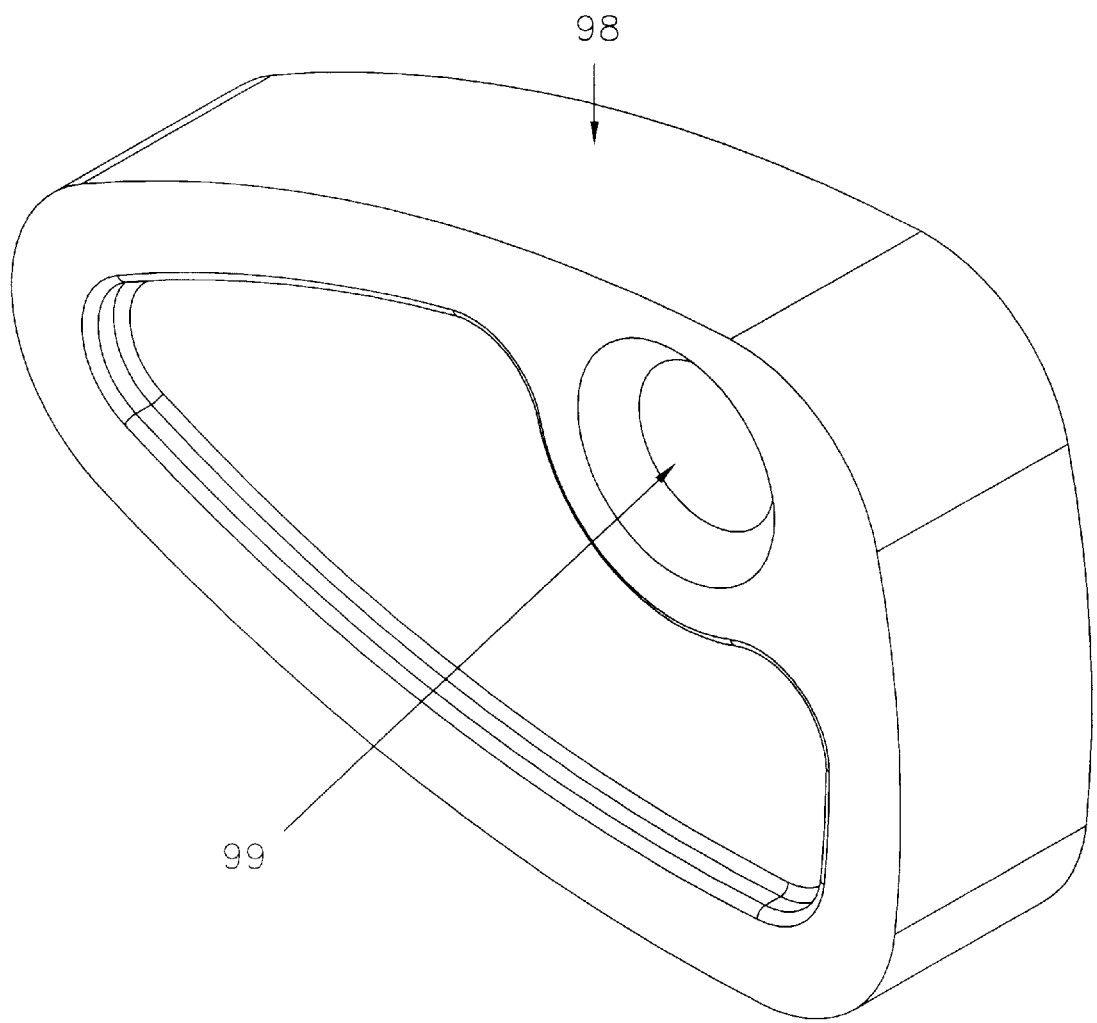
FIG. 15 is a perspective view of an over ride plate or cam.

The invention described herein also includes a means for releaseably securing at least one wheel of a vehicle as best illustrated in FIGS. 11, 12, and 13. Another embodiment of same is also shown in FIG. 14.

Figure 2C:
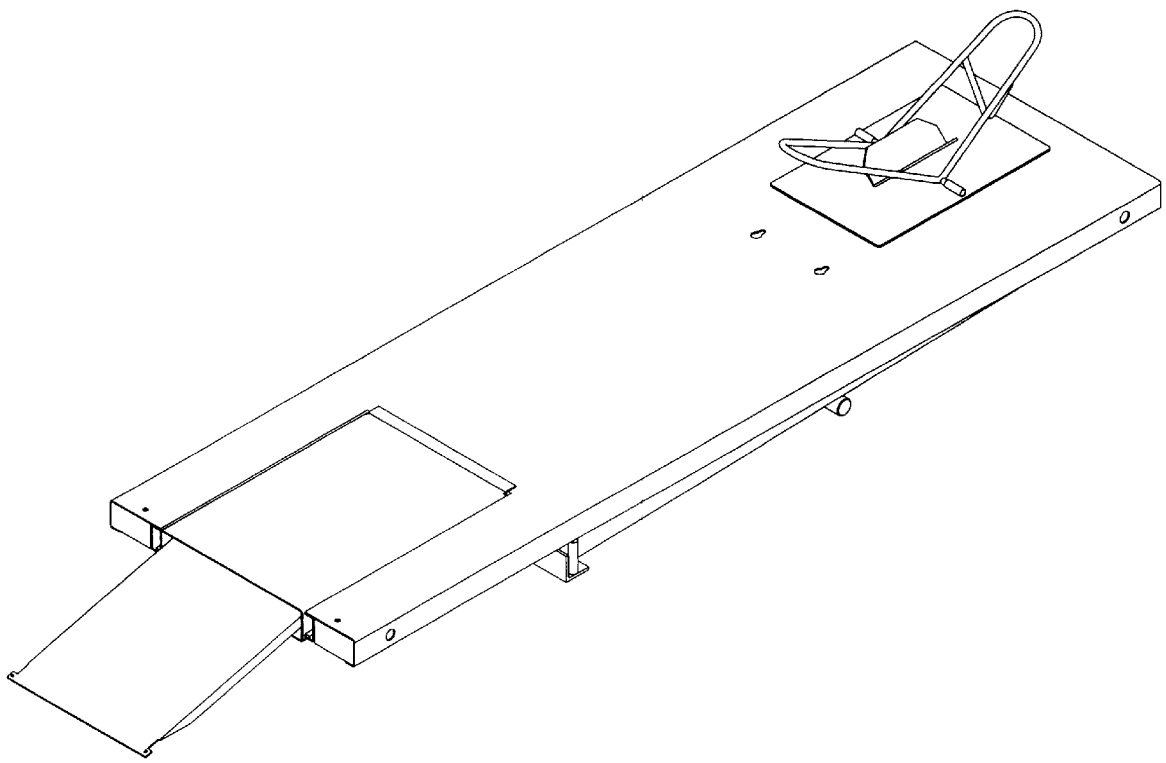
Figure 3:
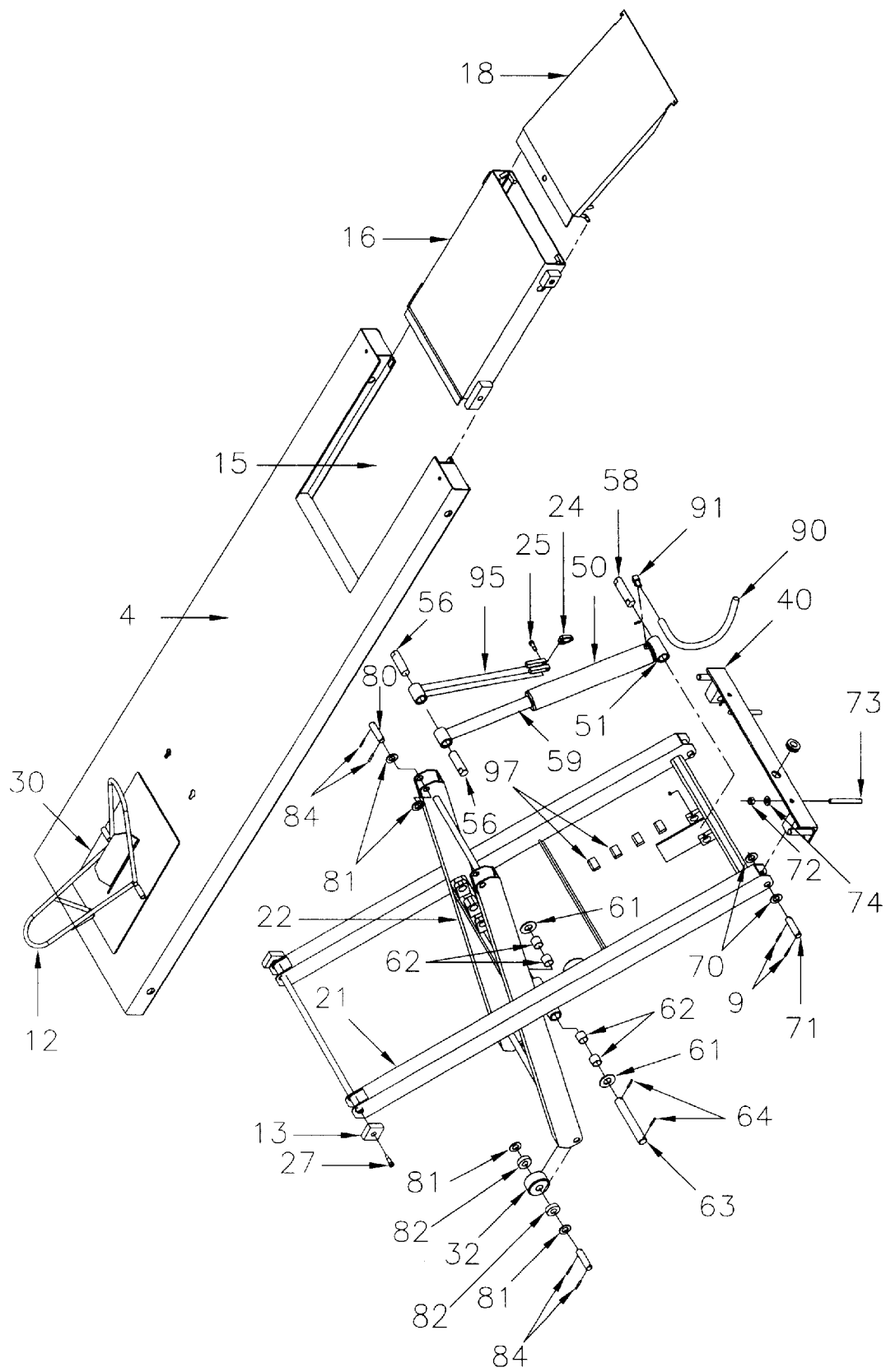
FIG. 3 is an exploded parts drawing of the motorcycle lift.
Figure 4:
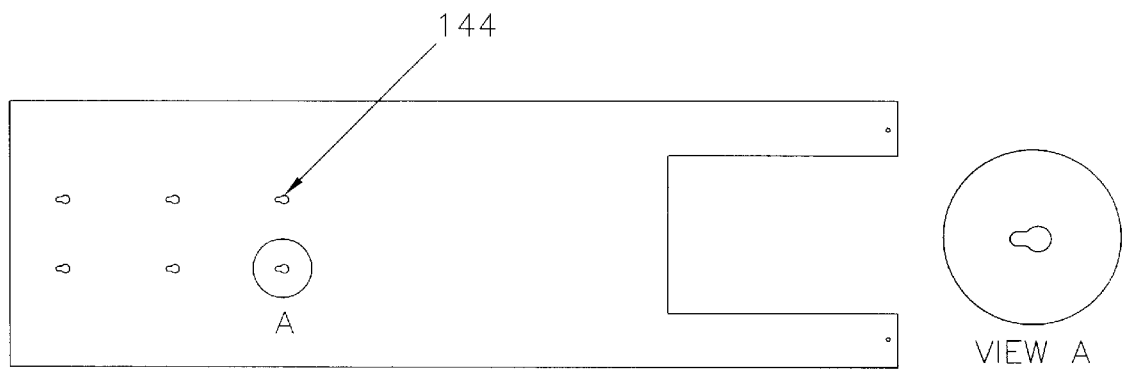
FIG. 4 is a top plan view of the support platform.
Figure 5:
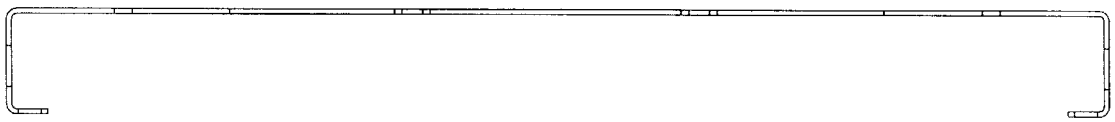
FIG. 5 is an enlarged cross-sectional view of said support platform.

The embodiment show in FIGS. 11, 12 and 13 comprises a wheel chock 12, which consists of a wheel receiving means which permits entry of a wheel therein in a first receiving position shown in FIG. 2c and a second holding position as shown in FIGS. 1 and 7. In particular the wheel receiving means comprises pivotal wheel receiving means to permit the entry of a wheel therein. More specifically the wheel receiving means includes a base 140 which includes a series of shoulder bolts 142 adapted to be received by a series of receiving slots or holes 144 best shown in FIG. 4. However other means can be utilized to secure the wheel chock 12 to the support platform 4. However the wheel chock 12 is movable and may also be secured to another surface such as the ground or cement floor in a garage. Accordingly the wheel chock described herein may be used by itself apart from the motorcycle lift described herein.

The wheel chock includes a first wheel engaging member and a second wheel engaging member 152 which is connected to the first wheel engaging member at an angle as best shown in FIG. 11. The angle in one embodiment as shown in FIG. 11 comprises an obtuse angle. The first wheel engaging member 150 and second wheel engaging member 152 are connected to one another and are pivotally connected at 154 for pivotal movement relative said base.

More particularly the first wheel engaging member 150 is adapted for horizontal contact with the base 140 to permit the front wheel of a motorcycle to ride over the first wheel engaging member 150 in a first receiving position. The front wheel then contacts the second wheel engaging member 152 thereby causing the first and second wheel engaging members 150, 152 to rotate clockwise as shown in FIG. 11 so as to hold or cradle the front wheel therebetween in a second holding position. The second wheel engaging member 152 includes a depending stop member 156 which will contact the base 140 and prevent any further rotation therein.

The stop member 156 can comprise a U-shaped rod welded to the second U-shaped wheel engaging member as best illustrated in FIGS. 11 and 13. Furthermore the U-shaped rod 156 also acts to reinforce the strength and rigidity of the wheel chock.

Moreover the wheel chock also includes reinforcing rods 158 which project into the wheel chock as best illustrated in FIG. 12 so as not only to reinforce the structure but also provides a surface for the front wheel 14 to ride up unto. Moreover the reinforcing members 158 may also present a surface which will accommodate narrower sized front wheels 14 since they can brush up against the sides of the wheel 14. Alternatively the wheel reinforcing members 158 may contact the lower side of the wheel 14 in the event that a much wider front wheel is utilized.

Accordingly the driver of a motorcycle may drive up over the wheel chock which may either be located on a top of a view motorcycle lift as shown in FIG. 1 or a wheel chock may be secured to a concrete floor thereby permitting individuals to work on their motorcycles in their garage on the like.

Once the user approaches the wheel chock with a motorcycle 6 the first U-shaped rod 150 is generally disposed horizontally in contact with the base 140. In this receiving position the first U-shaped rod locates and guides the front wheel of a motorcycle therein. Upon further movement of the front wheel the front wheel contacts the second U-shaped rod portion causing the wheel chock to rotate in a clockwise manner as best shown in FIG. 11 until the stop rod 156 contacts the base 140. In this position the front wheel is releaseably secured in an upright position. A user may then work on the motorcycle. If the wheel chock is located on top of a support platform of the lift shown in FIG. 1 further restraining straps 160 may be utilized.

An alternate embodiment of the wheel receiving means is shown in FIG. 14 comprises of two spaced apart clamp members which when activated by pressure such as pneumatic means clamp the sides of the front wheel in a secure manner. Upon releasing the hydraulic pressure the clamping members move apart thereby permitting the front wheel to be withdrawn therefrom. Furthermore the wheel clamping device as shown in FIG. 14 may also be adapted to be removably secured to the support platform or to the ground as previously described in relation to the wheel chock.

The motorcycle lift can be lifted by actuating the actuator 50.

The lift is generally constructed of steel tubing and the like having the appropriate strength characteristics.

Various embodiments of the invention have now been described in detail. Since changes in and/or additions to the above-described best mode may be made without departing from the nature, spirit or scope of the invention, the invention is not to be limited to said details.

We claim:

1. A motorcycle lift comprising:
   (a) a single support platform for supporting said motorcycle, a support platform including a flat surface for contacting a wheel of said motorcycle;
   (b) a pair of scissor assemblies beneath said support platform for lifting and lowering said support platform, each said scissor assembly comprising:
      (i) first and second scissor arms pivotally connected generally between their ends;
      (ii) said first scissor arm having a first end for supporting said lift on the ground below one end of said support platform and a guide means at said other end for supporting said support platform;
      (iii) one end of said second scissor arms pivotally attached to said support platform at said one end and a ground engaging roller at said other end thereof;
   (c) an actuator connected between said first scissor arms and second scissor arms for raising and lowering said support platform;
   (d) means for releasably securing a wheel of said motorcycle to said support platform;
   (e) said releasable securing means comprises:
      (a) a first U-shaped rod having two ends;
      (b) a second U-shaped rod having two ends
   said first and second U-shaped rods connected together so as to rotate together at their ends for pivotal movement thereabouts.

2. A motorcycle lift as claimed in claim 1 wherein said first and second U-shaped rods are disposed at an angle.

3. A motorcycle lift as claimed in claim 1 wherein said second U-shaped rod has a stop means for stopping said pivotal movement.

4. A motorcycle lift as claimed in claim 3 including reinforcing rods connected to said first and second U-shaped rods for accommodating different sized wheels.

5. A motorcycle lift as claimed in claim 1 including straps extending between said motorcycle and said support platform.

6. A motorcycle lift comprising:
   (a) a support platform for supporting a motorcycle, said support platform including a flat surface for contacting a wheel of said motorcycle;
   (b) a pair of scissor assemblies beneath said support platform for lifting and lowering said support platform;
   (c) means for releasably securing a wheel of said motorcycle to said support platform;

(d) said releasable securing means comprising:
  (i) a first substantially flat U-shaped rod having two ends;
  (ii) a second substantially flat U-shaped rod having two ends said first and second substantially flat U-shaped rods connected together at their ends for pivotal movement thereabouts wherein said first and second substantially flat U-shaped rods are welded together—has been inserted after "thereabouts".

7. A motorcycle lift as claimed in claim 6 further including a pair of spaced bars, each said bar having one end welded to said first substantially flat U-shaped rod and another end welded to said second substantially flat U-shaped rod so as to permit said wheel to be captured between said first and second substantially flat U-shaped rods.

8. A motorcycle lift as claimed in claim 7 wherein said first substantially flat U-shaped rod is adapted to contact said flat surface as said wheel enters said first rod, and said first and second rods are adapted to rotate together as said first and second rods pivotally rotate together.

9. A motorcycle lift as claimed in claim 8 wherein said second rod includes means to stop rotation of said first and second rods.

10. A motorcycle lift as claimed in claim 6 wherein said releasable securing means is selectively securable to moveable from said flat surface.

11. A motorcycle lift as claimed in claim 10 wherein said wheel securing means includes a base which Includes a series of shoulder bolts adapted to be received by a series of receiving slots presented by said flat surface.

* * * * *